US011687852B2

(12) United States Patent
Shike et al.

(10) Patent No.: US 11,687,852 B2
(45) Date of Patent: Jun. 27, 2023

(54) MANAGEMENT DEVICE, CONSTRUCTION MANAGEMENT SYSTEM, AND POSITION INFORMATION MANAGEMENT METHOD

(71) Applicant: Komatsu Ltd., Tokyo (JP)

(72) Inventors: Chikashi Shike, Tokyo (JP); Yuuichi Nemoto, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 16/099,792

(22) PCT Filed: Aug. 8, 2017

(86) PCT No.: PCT/JP2017/028759
§ 371 (c)(1),
(2) Date: Nov. 8, 2018

(87) PCT Pub. No.: WO2018/030402
PCT Pub. Date: Feb. 15, 2018

(65) Prior Publication Data
US 2019/0138959 A1  May 9, 2019

(30) Foreign Application Priority Data
Aug. 12, 2016  (JP) .................... 2016-159033

(51) Int. Cl.
G06Q 10/0631  (2023.01)
G06Q 50/08    (2012.01)
(Continued)

(52) U.S. Cl.
CPC ....... G06Q 10/06312 (2013.01); G05B 23/02 (2013.01); G06Q 50/08 (2013.01);
(Continued)

(58) Field of Classification Search
None
See application file for complete search history.

(56) References Cited

U.S. PATENT DOCUMENTS

2004/0210380 A1  10/2004 Morita et al.
2007/0185636 A1   8/2007 Cooley et al.
(Continued)

FOREIGN PATENT DOCUMENTS

CN  109074614 A    12/2018
JP  2002-091547 A   3/2002
(Continued)

OTHER PUBLICATIONS

Bo Yan et al., Design of Sight Spot Ticket Management System Based on RFID, 2009, 2009 International Conference on Networks Security, Wireless Communications and Trusted Computing (Year: 2009).*

(Continued)

Primary Examiner — Shelby A Turner
Assistant Examiner — Matthew H Divelbiss
(74) Attorney, Agent, or Firm — Locke Lord LLP

(57) ABSTRACT

A management device includes a ticket issuance unit that issues a ticket indicating work related to a construction site, a position information acquisition unit that acquires position information of a communication terminal acquiring the ticket, and an output unit that outputs the position information of the communication terminal selecting the ticket regarding the same construction site among the position information acquired by the position information acquisition unit.

20 Claims, 11 Drawing Sheets

(51) Int. Cl.
  *G05B 23/02* (2006.01)
  *G06Q 50/30* (2012.01)
  *G09B 29/00* (2006.01)
  *G06F 3/14* (2006.01)

(52) U.S. Cl.
  CPC .......... *G06Q 50/30* (2013.01); *G09B 29/007* (2013.01); *G06F 3/14* (2013.01)

(56) References Cited

U.S. PATENT DOCUMENTS

| | | | | |
|---|---|---|---|---|
| 2008/0011839 A1* | 1/2008 | Noll | ............ | G06Q 10/08 701/1 |
| 2012/0246039 A1* | 9/2012 | Fain | ............ | G06Q 10/08 705/341 |
| 2016/0306355 A1* | 10/2016 | Gordon | ............ | G06Q 10/06312 |
| 2017/0285655 A1 | 10/2017 | Katou et al. | | |
| 2019/0139164 A1 | 5/2019 | Shike et al. | | |

FOREIGN PATENT DOCUMENTS

| | | | |
|---|---|---|---|
| JP | 2003143641 A | * | 5/2003 |
| JP | 2003-296402 A | | 10/2003 |
| JP | 2004-220433 A | | 8/2004 |
| JP | 2008-071008 A | | 3/2008 |
| JP | 2008-210087 A | | 9/2008 |
| JP | 2008-242858 A | | 10/2008 |
| JP | 2010-072696 A | | 4/2010 |
| JP | 2010-073031 A | | 4/2010 |
| JP | 2011-143724 A | | 7/2011 |
| JP | 2013-156835 A | | 8/2013 |
| WO | 2016/072329 A1 | | 5/2016 |

OTHER PUBLICATIONS

Yasuhiro Kawai, "Spreading beacon IoT", Nikkei Communications, Japan, Nikkei Business Publications, Inc., vol. 626, Mar. 1, 2016, pp. 74-75, information sheets and a partial English translation of related portions, (cited in the Mar. 20, 2019 Office Action issued for JP2016-159033).

* cited by examiner

MANAGEMENT DEVICE, CONSTRUCTION MANAGEMENT SYSTEM, AND POSITION INFORMATION MANAGEMENT METHOD

TECHNICAL FIELD

The present invention relates to a management device, a construction management system, and a position information management method.

Priority is claimed on Japanese Patent Application No. 2016-159033, filed Aug. 12, 2016, the content of which is incorporated herein by reference.

BACKGROUND ART

Patent Literature 1 discloses a technology of displaying position information of a work machine that is a management target on a map by a user registering a work machine, which is under management of the user, in a management system.

CITATION LIST

Patent Literature

[Patent Literature 1] Japanese Unexamined Patent Application, First Publication No. 2002-91547

SUMMARY OF INVENTION

Technical Problem

At a construction site, a number of business operators often perform construction work. For example, at a construction site, a business operator performing embankment construction and excavation construction may be different from an operator performing transport of earth and sand. In a management system, when position information of a working machine operating at a construction site is confirmed, it is necessary to register information on the work machine managed by a plurality of business operators in advance. Further, business operators who differ from day to day are likely to work at a certain construction site. Therefore, it may not be realistic to register information on all the work machines working at the construction site in the management system.

An object of aspects of the present invention is to provide a management device capable of confirming position information of a plurality of work machines working at the same construction site regardless of whether or not the work machines are under management of the management device, a construction management system, and a position information management method.

Solution to Problem

According to a first aspect of the present invention, a management device includes a ticket issuance unit that issues a ticket associated with a construction site; a position information acquisition unit that acquires position information of a communication terminal acquiring the ticket; and an output unit that outputs the position information of the communication terminal acquired by the position information acquisition unit.

According to a second aspect of the present invention, a management device includes a ticket issuance unit that issues a ticket associated with a group; a position information acquisition unit that acquires position information of a communication terminal acquiring the ticket; and an output unit that outputs the position information of the communication terminal acquired by the position information acquisition unit.

According to a third aspect of the present invention, a construction management system includes a transport vehicle associated with a construction site; a first communication terminal included in the transport vehicle; a construction machine associated with the construction site; a second communication terminal included in the construction machine; a ticket issuance unit that issues a ticket corresponding to the transport vehicle and the construction machine; a position information acquisition unit that acquires position information of the first communication terminal and the second communication terminal on the basis of the ticket; and a display unit that displays a map image in which the positions of the first communication terminal and the second communication terminal are stored on the basis of position information acquired by the position information acquisition unit.

According to a fourth aspect of the present invention, a position information management method includes issuing a ticket associated with a construction site; acquiring position information of a communication terminal acquiring the ticket; and displaying the acquired position information of the communication terminal on the communication terminal.

According to a fifth aspect of the present invention, a position information management method includes issuing a ticket associated with a group; acquiring position information of a communication terminal acquiring the ticket; and displaying the acquired position information of the communication terminal on the communication terminal.

Advantageous Effects of Invention

According to at least one of the above aspects, a management device capable of confirming position information of a plurality of work machines working at the same construction site regardless of whether or not the work machines are under management of the management device, a construction management system, and a position information management method are provided.

DESCRIPTION OF EMBODIMENTS

First Embodiment

<<Construction Management System>>

Figure 1:
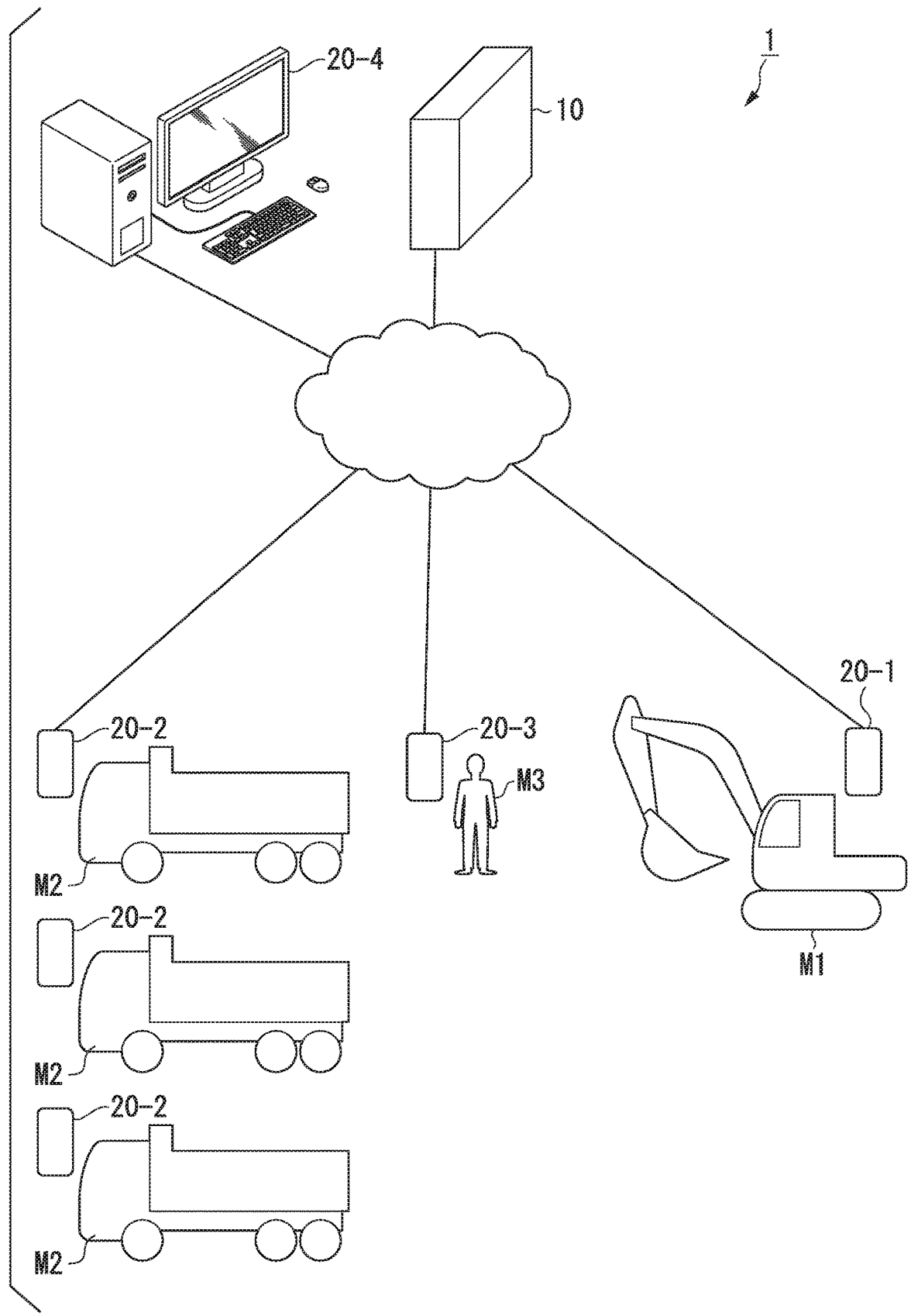
FIG. 1 is a schematic diagram illustrating a configuration of a construction management system according to a first embodiment.

FIG. 1 is a schematic diagram illustrating a configuration of a construction management system according to a first embodiment. The construction management system 1 includes a plurality of communication terminals 20 and a server device 10. The plurality of communication terminals 20 are included in a construction machine M1 or a transport vehicle M2 that is a management target of the construction management system 1. The construction machine M1 and the transport vehicle M2 are examples of a work machine used at a construction site. The communication terminal 20 may be installed inside the construction machine M1 or the transport vehicle M2. The communication terminal 20 may be owned by an operator of the construction machine M1 or the transport vehicle M2. The communication terminal 20 may be owned by a manager M3 at the construction site.

As the communication terminal 20, for example, a mobile phone, a smartphone, a portable computer, or an in-vehicle computer can be used. The communication terminal 20 may be a device mounted on the construction machine M1 or the transport vehicle M2. The server device 10 is an example of a management device. The communication terminal 20 may be a personal computer that is used by the manager M3 at an office away from the construction site. Hereinafter, the communication terminal 20 included in the construction machine M1 is referred to as a communication terminal 20-1. The communication terminal 20 included in the transport vehicle M2 is referred to as a communication terminal 20-2. The communication terminal 20 owned by the manager M3 is referred to as a communication terminal 20-3. The communication terminal 20 provided in an office is referred to as a communication terminal 20-4.

The construction machine M1 is a vehicle that operates at a loading place P1 (an earth and sand loading position or the like) at a certain construction site or at an unloading place P2 (an earth and sand dropping off unloading position or the like) to perform an embankment work or an excavation work. Examples of the working machine M1 include a hydraulic excavator, a bulldozer, and a wheel loader. The transport vehicle M2 is a vehicle that transports the earth and sand between the loading place P1 and the unloading place P2. An example of the transport vehicle M2 is a dump truck. The loading place P1 and the unloading place P2 are examples of a work area.

The construction management system 1 manages the position information of the construction machine M1 and the transport vehicle M2 that operate at a plurality of construction sites. Specifically, the construction management system 1 displays the map image D in which the positions of the construction machine M1 and the transport vehicle M2 operating on the same construction site are recorded, on the communication terminals 20 (the communication terminal 20-1, the communication terminal 20-2, the communication terminal 20-3, and the communication terminal 20-4) of the construction machine M1 and the transport vehicle M2 operating on the same construction site and the manager M3.

Figure 2:
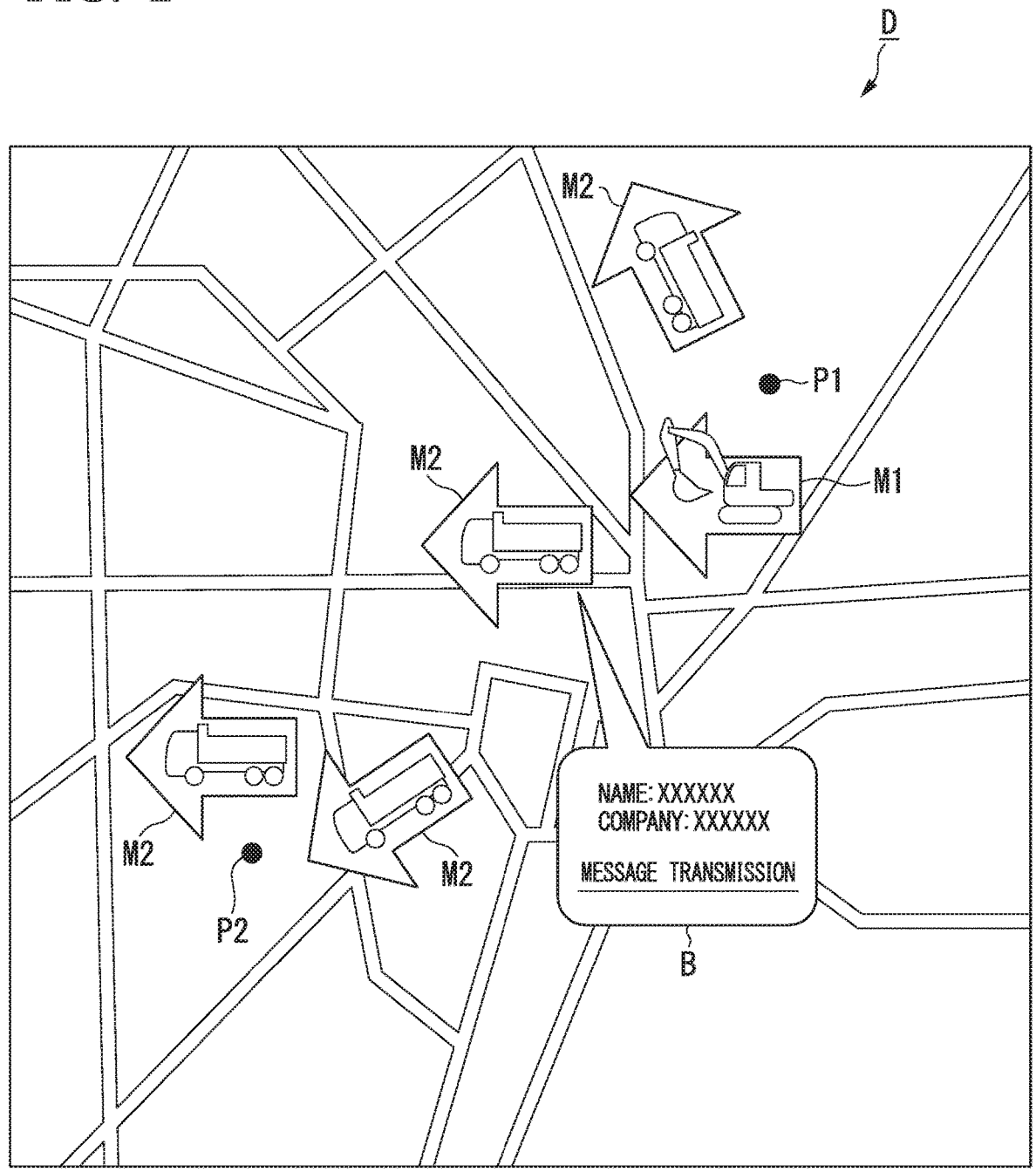
FIG. 2 is a diagram illustrating an example of a map image generated by the construction management system according to the first embodiment.

FIG. 2 is a diagram illustrating an example of a map image generated by the construction management system according to the first embodiment.

The communication terminal 20 generates a map image as illustrated in FIG. 2 on the basis of the information acquired from the server device 10, and displays a map screen including the map image. As illustrated in FIG. 2, in the map image D, a background map image, icons indicating the loading place P1 and the unloading place P2 at the construction site, and icons indicating positions and traveling directions of the construction machine M1 and the transport vehicle M2 operating at the construction site are displayed. Further, when the icons of the construction machine M1 and the transport vehicle M2 are selected, a balloon B in which information on the construction machine M1 (for example, a user's name, a company name, or a shortcut with a messaging function) is stored is displayed. As illustrated in FIG. 2, the construction machine M1 and the transport vehicle M2 are displayed in different aspects. In addition, the construction site may include one region or may include a plurality of separate regions.

<<Server Device>>

Figure 3:
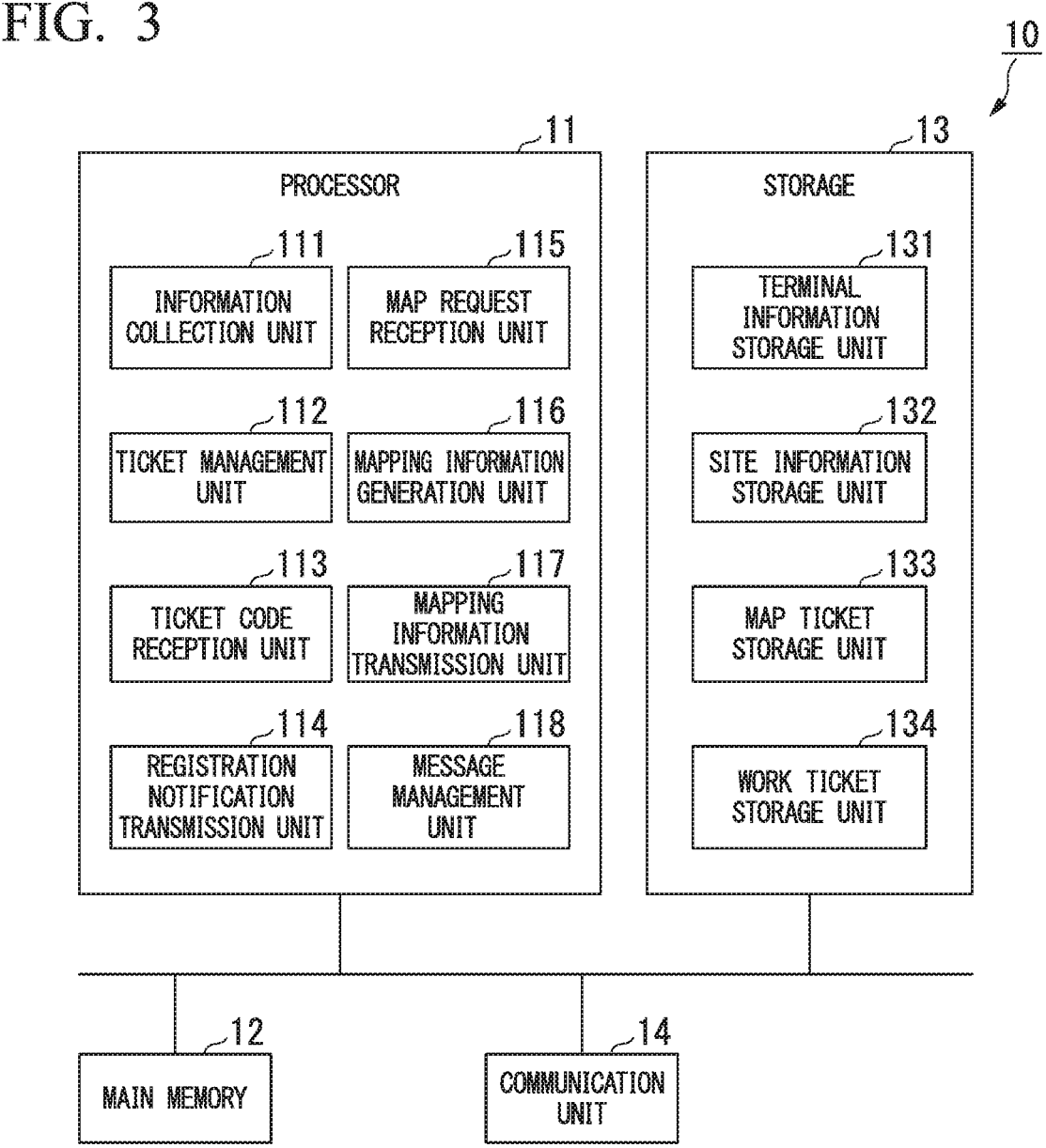
FIG. 3 is a schematic block diagram illustrating a configuration of a server device according to the first embodiment.

FIG. 3 is a schematic block diagram illustrating a configuration of the server device according to the first embodiment.

The server device 10 includes a processor 11, a main memory 12, a storage 13, and a communication unit 14. The storage 13 stores a server-side construction management program. The processor 11 reads the server-side construction management program from the storage 13, develops the server-side construction management program on the main memory 12, and executes a process according to the server-side construction management program. As the communication unit 14, a network card or the like can be used.

The storage 13 has a storage area as a terminal information storage unit 131, a site information storage unit 132, a map ticket storage unit 133, and a work ticket storage unit 134.

The terminal information storage unit 131 stores information on the communication terminal 20. Specifically, the terminal information storage unit 131 stores a terminal ID, position information, a user's name, a company name, and other information in association with each other. The terminal ID is information for identifying the communication terminal 20. Any information, such as a contractor-specific ID, a telephone number, an email address, an MAC address of the communication terminal 20, a manufacturing number, or a unique number attached by the server device 10, may be used as the terminal ID as long as the information can specify the communication terminal 20.

The position information is information indicating the position of the communication terminal 20 acquired by a global navigation satellite system (GNSS) or the like. The position information includes a traveling direction of the communication terminal. The traveling direction of the communication terminal 20 can be obtained, for example, on the basis of a temporal transition of the obtained position information. The user's name, the company name, and the like is information on an owner of the communication terminal 20 or a contractor of the construction management system 1, and is information registered in the server device 10 via the communication terminal 20 in advance.

The site information storage unit 132 stores information on the construction site. Specifically, the site information storage unit 132 stores the site 1D, the loading place P1, and the unloading place P2 in association with each other. The site 1D is information for identifying the construction site. Any information, such as a unique number set for each site, a unique name such as a place name, or an address, may be used as the site ID as long as the information is information capable of specifying the construction site.

The map ticket storage unit 133 stores a My Map and a ticket indicating allocation of the communication terminal 20 (hereinafter also referred to as a map ticket). The My Map is a map that can be customized for each communication terminal 20 (a primary terminal) and is a map in which position information of any arbitrary communication terminal 20 (a secondary terminal) can be recorded. The ticket is information for forming a certain group (for example, a group of My Maps or a group of construction sites) using any communication terminal 20. A ticket code is used to form the group. The ticket code may be, for example, a one-time password, and a four-digit number may be used.

The map ticket storage unit 133 stores a ticket code, a primary terminal ID, a secondary terminal ID, and an expiration date in association with each other. The ticket code is information for identifying the map ticket. The primary terminal ID is a terminal ID of the communication terminal 20 authorized to customize a My Map. The secondary terminal ID is a terminal ID of the communication terminal 20 in which the position information is recorded on the My Map. The map ticket is an example of a ticket associated with a group (My Map).

The work ticket storage unit 134 stores information on a ticket (hereinafter, also referred to as a work ticket) indicating an assignment relationship between the work at the construction site and the worker. The work ticket is prepared as a different ticket according to the type of work. That is, the work ticket storage unit 134 separately stores a ticket for the construction machine M1 and a ticket for the transport vehicle M2 for tickets related to the same construction site. For example, the manager M3 can prepare a ticket for each type of work using the communication terminal 20-3. In addition, the manager M3 may prepare a ticket for the manager M3.

Specifically, the work ticket storage unit 134 stores the site ID, the type of work, the ticket code, the number of tickets, the terminal ID, and the expiration date in association with each other. The type of work is information indicating whether a target of the ticket is the transport vehicle M2, the construction machine M1, or the manager M3. A ticket in which the type of work indicates the transport vehicle M2 is an example of a ticket for a transport vehicle. A ticket in which the type of work indicates the construction machine M1 is an example of a ticket for a construction machine. A ticket in which the type of work indicates the manager M3 is an example of a ticket for a manager.

The ticket code is, for example, information for identifying the work ticket. When a correct ticket code is input to the communication terminal 20, the communication terminal 20 is associated with the construction site. The number of tickets is a numerical value for setting the number of vehicles required for each type of work. For example, when five transport vehicles M2 are required at a certain construction site, the manager M3 sets the number of tickets for the transport vehicle M2 to "5." The expiration date is information indicating an expiration date of the work indicated by the ticket. The content is information indicating the work indicated by the ticket or the content of the group.

By executing the server-side construction management program, the processor 11 functions as an information collection unit 111, a ticket management unit 112, a ticket code reception unit 113, a registration notification transmission unit 114, a map request reception unit 115, a mapping information generation unit 116, and a mapping information transmission unit 117.

The information collection unit 111 collects the terminal ID, the position information, the user's name, the company, and other information from the communication terminal 20, and stores the collected information in the terminal information storage unit 131. The information collection unit 111 is an example of a position information acquisition unit that acquires position information from the transport vehicle M2 associated with the construction site.

The ticket management unit 112 receives an input of information on construction (a site ID, a type of work, and the like) and a work ticket issuance request (the number of tickets, an expiration date, and the like) from the user (for example, the manager M3), and issues a work ticket having a ticket code. The ticket management unit 112 receives an input of a map ticket issuance request from the user and issues a map ticket having a ticket code. An example of issuance of the ticket may include transmitting a ticket code to the communication terminal 20-3 and the communication terminal 20-4 that are ticket issuance request sources via the communication unit 14. The ticket management unit 112 records information on the issued ticket in the map ticket storage unit 133 or the work ticket storage unit 134. The ticket management unit 112 compares the ticket code received by the ticket code reception unit 113 to be described below with the ticket code already stored in the ticket storage unit 133, and stores the terminal ID to be transmitted together with the ticket code in the ticket storage unit 133 when the ticket codes match. The ticket management unit 112 is an example of a ticket issuance unit.

When the ticket code is input at the communication terminal 20-1 and the communication terminal 20-2, the ticket code reception unit 113 receives at least the terminal ID and the ticket code from the communication terminal 20-1 and the communication terminal 20-2 via the communication unit 14. The ticket code reception unit 113 outputs the received ticket code and the received terminal ID to the ticket management unit 112.

The registration notification transmission unit 114 transmits a registration notification indicating whether or not the ticket can be registered to the communication terminal 20-1 and the communication terminal 20-2 that are ticket code transmission sources via the communication unit 14.

The map request reception unit 115 receives a map request for requesting transmission of mapping information from the communication terminal 20. The map request includes a request for a site map and a request for a My Map. The site map is a map image in which the position information of the construction machine M1 and the transport vehicle M2 operating at one construction site, the loading place P1, and the unloading place P2 are recorded. My Map is a map that can be customized for each communication terminal 20 as described above and is a map in which position information of any communication terminal 20 can be recorded.

The map request includes a type of map (the site map or the My Map) and the terminal ID of the communication terminal requesting the map. The map request may be, for example, an HTTP request for designating the type of map and the terminal ID in a format of a uniform resource locator (URL). Specifically, it is possible to generate the map request by storing the type of map and the terminal ID in a parameter designated by a GET method or a POST method of the HTTP request.

When the map request reception unit 115 receives the map request, the mapping information generation unit 116 generates mapping information by referring to the terminal information storage unit 131, the site information storage unit 132, the map ticket storage unit 133, and the work ticket storage unit 134. The mapping information is information including the position information of the communication terminal 20-1 or the communication terminal 20-2 included in the construction machine M1 or the transport vehicle M2, which is used for generation of the map image D.

The mapping information transmission unit 117 transmits the mapping information generated by the mapping information generation unit 116 to the communication terminal 20 that is a map request transmission source. The mapping information transmission unit 117 is an example of an output unit that outputs the position information of each communication terminal 20 selecting the ticket regarding the same construction site.

The message management unit 118 relays messages (e-mails, voice messages, or the like) between the communication terminals 20. The message management unit 118 receives a message from a certain communication terminal 20 and transmits the message to another communication terminal 20 that has acquired the ticket associated with the same construction site as the communication terminal 20.

<<Communication Terminal>>

Figure 4:
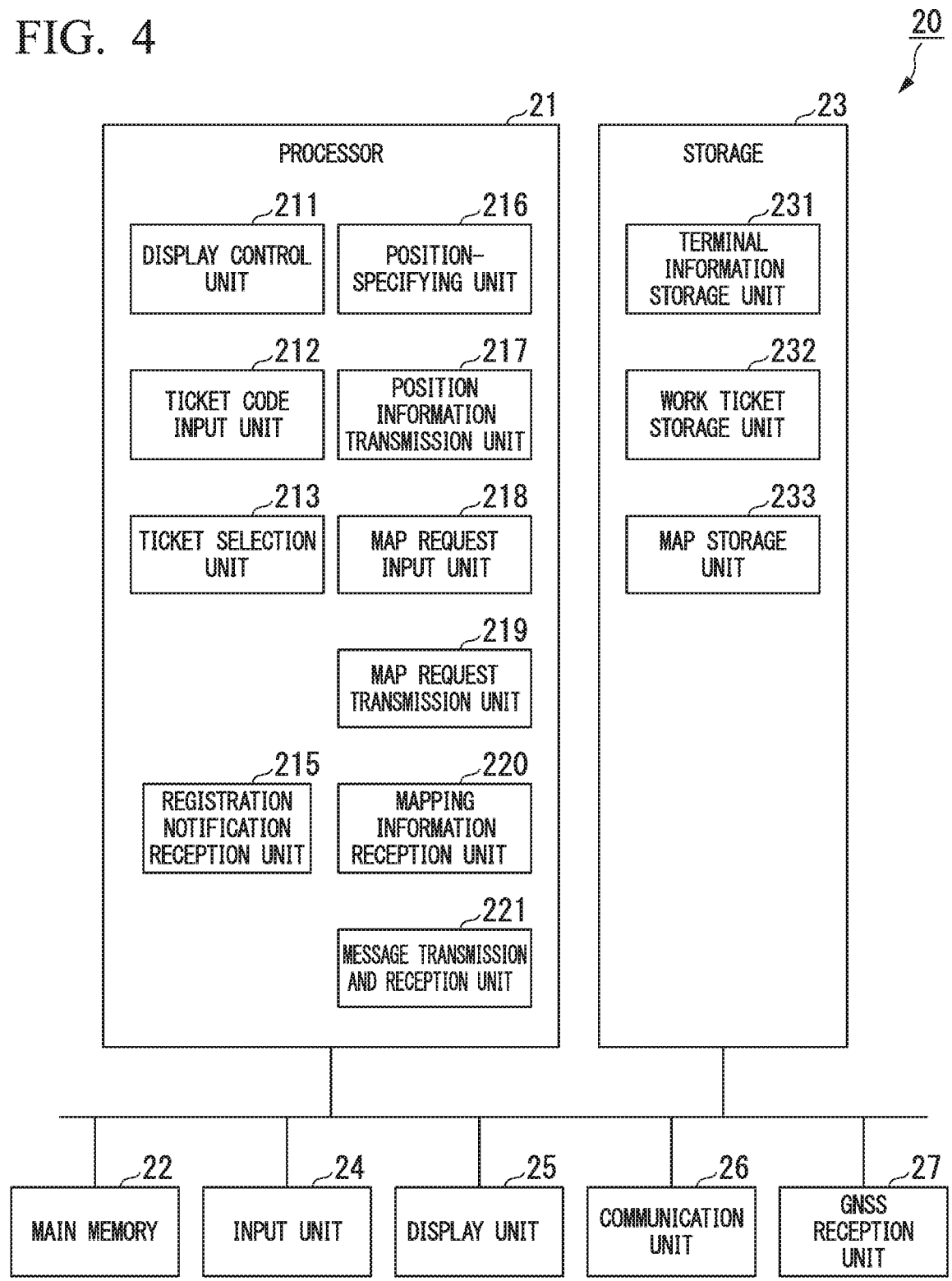
FIG. 4 is a schematic block diagram illustrating a configuration of a communication terminal according to the first embodiment.

FIG. 4 is a schematic block diagram illustrating a configuration of the communication terminal according to the first embodiment.

The communication terminal 20 (the communication terminal 20-1, the communication terminal 20-2, the communication terminal 20-3, and the communication terminal 20-4) includes a processor 21, a main memory 22, a storage 23, an input unit 24, a display unit 25, a communication unit 26, and a GNSS reception unit 27. The storage 23 stores a terminal side construction management program. The processor 21 reads the terminal side construction management program from the storage 23, develops the terminal side construction management program in the main memory 22, and executes a process according to the terminal side construction management program. A touch panel, a keyboard, a ten key, a mouse, and the like can be used as the input unit 24. A touch panel, a liquid crystal display, an organic electroluminescence (EL) display, or the like can be used as the display unit 25. A network card or the like can be used as the communication unit 26. The GNSS reception unit 27 receives a GNSS signal from an artificial satellite. The received GNSS signal is used to specify the position information.

The storage 23 includes a storage area as a terminal information storage unit 231 and a work ticket storage unit 232.

The terminal information storage unit 231 stores a terminal ID, a name of a user, a company name, and other information. The user can rewrite the name, company name, and other information stored in the terminal information storage unit 231.

The work ticket storage unit 232 stores the information on the ticket related to the construction site input by the user. Specifically, the work ticket storage unit 232 stores the ticket code, the site ID, the type of work, and the expiration date in association with each other. The work ticket storage unit 232 stores information on one or more tickets as a candidate for work to be engaged in by the user. The map storage unit 233 stores the background map image serving as a base of a map image related to the site map and the My Map. The background map image may be stored in advance or may be acquired from an external service.

By executing the terminal side construction management program, the processor 21 functions as a display control unit 211, a ticket code input unit 212, a ticket registration unit 213, a registration notification reception unit 215, a position-specifying unit 216, a position information transmission unit 217, a map request input unit 218, a map request transmission unit 219, and a mapping information reception unit 220.

The display control unit 211 generates a ticket code input screen, a ticket selection screen, a My Map, and a site map, and causes the display unit 25 to display the ticket code input screen, the ticket selection screen, the My Map, and the site map. The ticket code input unit 212 receives an input of the ticket code via the input unit 24. The ticket code input unit 212 transmits relevant information such as the input ticket code and the site ID to the server device 10 via the communication unit 26. Specifically, the ticket code input unit 212 transmits the information stored in the terminal information storage unit 231 and the ticket code.

When the ticket code input to the ticket code input unit 212 is correct, the ticket registration unit 213 stores the input ticket code in the work ticket storage unit 232. The registration notification reception unit 215 receives a registration notification indicating whether or not the ticket code can be registered, from the server device 10 via the communication unit 26. When content of the registration notification is that the ticket code has been registered, information indicating the registration is stored in the ticket storage unit $232_{[SP1]}$.

The position-specifying unit 216 specifies the position of the subject device on the basis of the GNSS signal, a wireless LAN signal, or other signals. The position information transmission unit 217 transmits the position information indicating the position specified by the position-specifying unit 216 and the terminal ID to the server device 10 via the communication unit 26.

The map request input unit 218 receives an input of the type of map (site map or My Map) to be displayed from the user via the input unit 24. Further, the map request input unit 218 may receive an input of a map request including a type of requested map and a terminal ID using an HTTP request. For example, when the My Map of the primary terminal is desired to be browsed using the communication terminal 20 which is not the primary terminal, the terminal ID of the primary terminal can be designated by inputting the map request using the HTTP request.

The map request transmission unit 219 transmits a map request including the type of map and the terminal ID to the server device 10 on the basis of the information input to the map request input unit 218. The mapping information reception unit 220 receives mapping information from the server device 10. The message transmission and reception unit 221 transmits and receives a message to and from another communication terminal 20 belonging to the same construction site via the server device 10.

<<Operation>>

A construction management method using the construction management system 1 according to the first embodiment will now be described.

Figure 5:
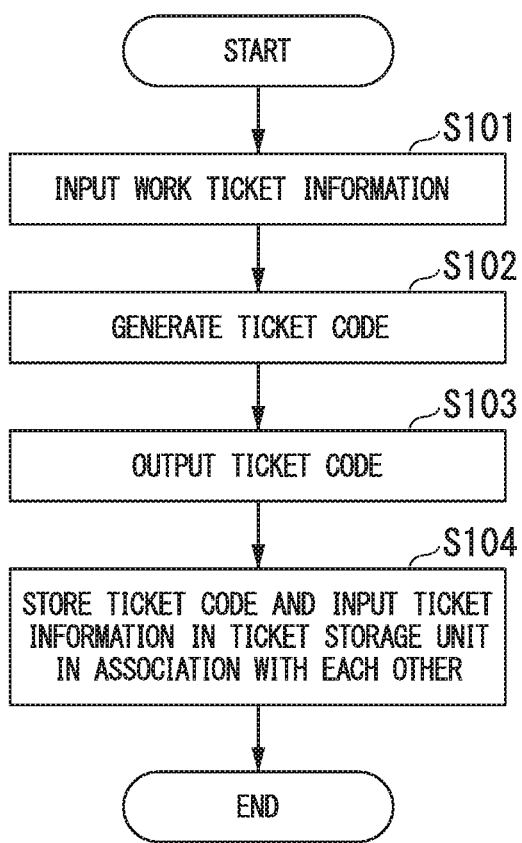
FIG. 5 is a flowchart showing a work ticket issuance process in the server device according to the first embodiment.

FIG. 5 is a flowchart showing a ticket issuance process in the server device according to the first embodiment.

The server device 10 starts the work ticket issuance process according to an operation of the user. For example, the server device 10 may receive a request for a work ticket issuance process from the communication terminal 20-3 and the communication terminal 20-4 of the manager M3. In addition, the manager M3 transmits a work ticket request at a stage of determining the worker of the construction machine M1 and the worker of the transport vehicle M2 at the time of construction from now.

When the server device 10 starts the work ticket issuance process, the ticket management unit 112 allows to receive an input of work ticket information (a site ID, a type of work, the number of tickets for each type of work, and an expiration date) from the user (Step S101). When the ticket management unit 112 receives the input of the work ticket information, the ticket management unit 112 generates a ticket code by referring to the ticket code stored in the work ticket storage unit 134 (Step S102).

Then, the ticket management unit 112 outputs the generated ticket code (Step S103). For example, when the ticket management unit 112 receives the request for the work ticket issuance process from the communication terminal 20-3 of the manager M3, the ticket management unit 112 transmits the ticket code to the communication terminal 20-3 or the communication terminal 20-4 that is a request transmission source, and causes the display unit 25 of the communication terminal 20-3 or the communication terminal 20-4 to display a ticket code (a ticket code for a construction machine and a ticket code for a transport vehicle) for each type of work.

Then, the ticket management unit 112 stores the ticket code generated in step S102 and the information input in step S101 in the work ticket storage unit 134 in association with each other (Step S104). Accordingly, the server device 10 can issue a ticket indicating work information. When the ticket is issued, the manager M3 at the construction site presents the ticket code for a construction machine and the ticket code for a transport vehicle to a worker working in the construction machine M1 and to a worker working in the transport vehicle M2 at the construction site. The presentation of the ticket code is performed using, for example, a method such as oral notification or e-mail presentation.

Figure 6:
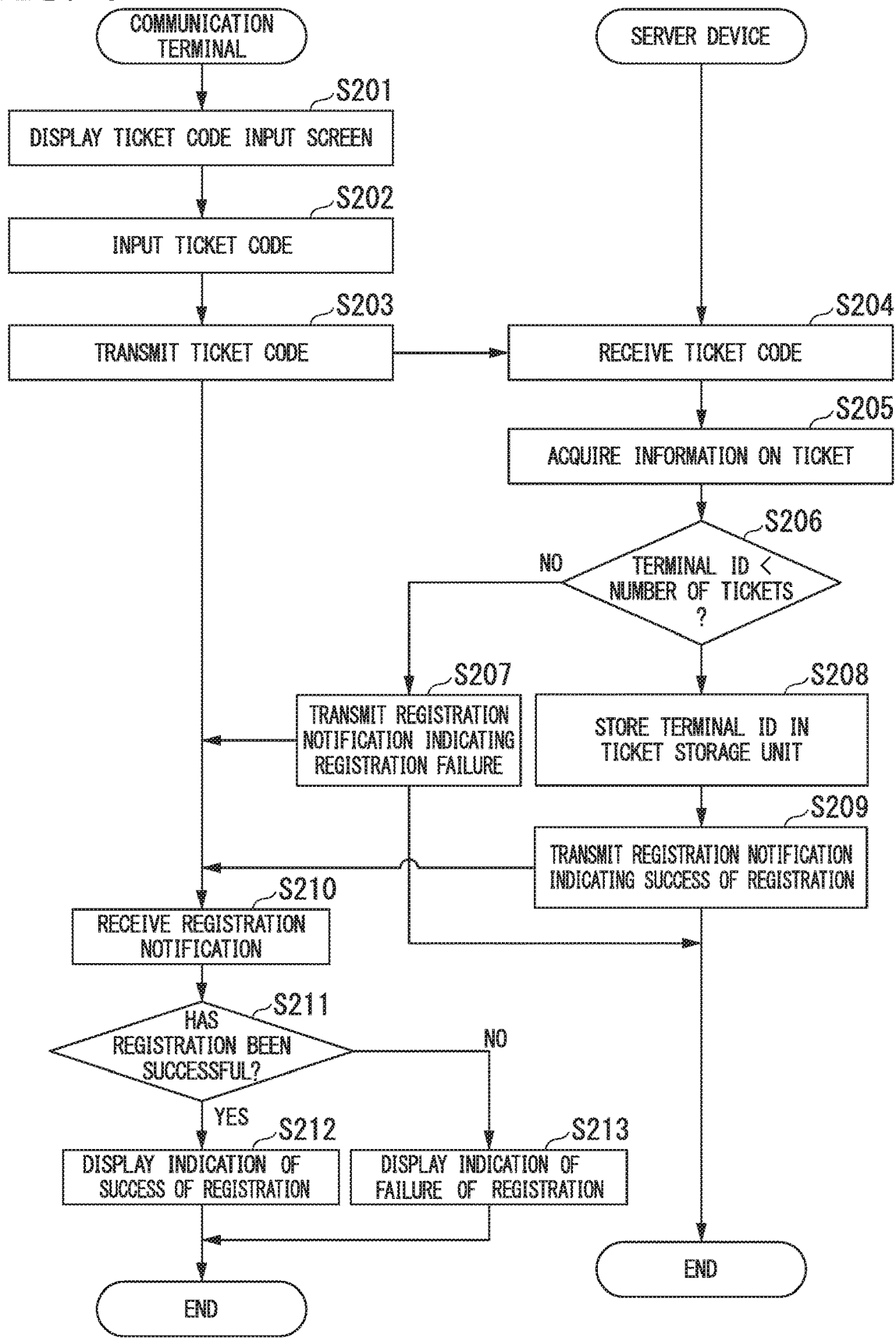
FIG. 6 is a sequence diagram illustrating a process at the time of work ticket acquisition in the construction management system according to the first embodiment.

FIG. 6 is a sequence diagram illustrating a process at the time of acquisition of the work ticket in the construction management system according to the first embodiment.

When the communication terminal 20-1 or the communication terminal 20-2 transitions to a work ticket code input mode according to an operation of the worker of the construction machine M1 or the worker of the transport vehicle M2, the display control unit 211 displays a ticket code input screen on the display unit 25 (Step S201). The work ticket code input screen includes a text box for receiving an input of the ticket code.

Then, the ticket code input unit 212 allows to receive the input of the ticket code via the input unit 24 (Step S202). The user inputs the ticket code presented from the manager M3 at the construction site to the communication terminal 20. When the ticket code is input, the ticket code input unit 212 transmits the input ticket code and the terminal ID to the server device 10 via the communication unit 26 (Step S203).

When the ticket management unit 112 of the server device 10 receives the ticket code from the communication terminal 20-1 and the communication terminal 20-2 (Step S204), the ticket management unit 112 of the server device 10 collates the received ticket code with the ticket code stored in the work ticket storage unit 134. The ticket management unit 112 acquires information on the ticket associated with the received ticket code (the site ID, the number of tickets, the type of work, the terminal ID, and the expiration date) from the work ticket storage unit 134 (Step S205).

Then, the ticket management unit 112 determines whether or not the number of terminal IDs included in the acquired information is smaller than the number of tickets included in the information on the ticket (Step S206). When the number of terminal IDs is not smaller than the number of tickets (Step S206: NO), the registration notification transmission unit 114 transmits a registration notification indicating registration failure to the communication terminal 20 (Step S207).

On the other hand, when the number of terminal IDs is smaller than the number of tickets (Step S206: YES), the ticket management unit 112 stores the terminal ID received together with the ticket code in association with the ticket code to be transmitted (Step S208). The registration notification transmission unit 114 transmits a registration notification indicating the success of the registration to the communication terminal 20 (Step S209). The registration notification indicating the success of the registration includes the ticket code, the site ID, the type of work, and the expiration date.

When the registration notification reception unit 215 of the communication terminal 20 receives a registration notification from the server device 10 (Step S210), the registration notification reception unit 215 of the communication terminal 20 determines whether or not the registration notification indicates the success of the registration (Step S211). When the registration notification indicates the success of the registration (Step S211: YES), the display control unit 211 causes the display unit 25 to display an indication that the registration of the ticket input in step S202 has been successful (Step S212). The ticket registration unit 213 causes the work ticket storage unit 232 to store the information received in step S209.

On the other hand, when the registration notification indicates that registration has failed (Step S211: NO), the display control unit 211 causes the display unit 25 to display that the registration of the ticket input in step S202 has failed (Step S213). Accordingly, the construction management system 1 can associate the work ticket with the communication terminal 20 in the range of the number of tickets.

Accordingly, it is possible to associate the communication terminal 20-1 included in the construction machine M1, the communication terminal 20-2 included in the transport vehicle M2, and the communication terminal 20-3 and the communication terminal 20-4 used by the manager M3 with the construction site defined by the predetermined site ID, and to display the map illustrated in FIG. 2 in each of the communication terminals 20 or perform transmission and reception of the message between the communication terminals 20.

Figure 7:
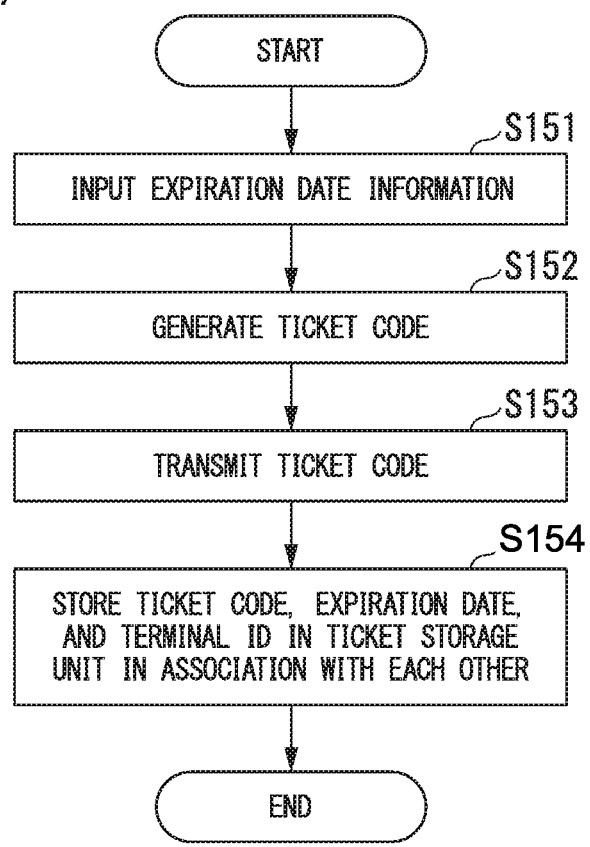
FIG. 7 is a flowchart showing a map ticket issuance process regarding a My Map in the server device according to the first embodiment.

FIG. 7 is a flowchart showing a map ticket issuance process regarding a My Map in the server device according to the first embodiment.

The "My Map" is an association scheme used when a current position of a predetermined worker is to be recognized or a message is to be easily transmitted regardless of whether or not workers involved in any work at sites (the operator of the construction machine M1, the operator of the transport vehicle M2, the manager M3, and the like) are at the same construction site. For example, when a business operator has a large number of transport vehicles M2, a plurality of transport vehicles M2 may be dispatched to a plurality of construction sites, and thus, it is useful for the business operator in order to recognize where the transport vehicles M2 of its own company disposed at each construction site are located.

The My Map can allow a group specific to a worker to be created and the position of the worker associated with the group to be recognized. When another worker tries to be associated with the My Map, the association is performed using a ticket as follows.

The server device 10 receives a request for a map ticket issuance process from the communication terminal 20 according to an operation of a user who tries to create the My Map. The user here may be the manager M3 or may be the worker of the construction machine M1 or the worker of the transport vehicle M2. When the server device 10 starts the map ticket issuance process, the ticket management unit 112 allows to receive an input of map ticket information such as an expiration date of the map ticket, a terminal ID, and other user information from the user (Step S151). When the ticket management unit 112 receives the input of the map ticket information, the ticket management unit 112 generates a ticket code (Step S152).

Then, the ticket management unit 112 transmits a ticket code to the communication terminal 20, which is a transmission source of a request of a map ticket issuance process (Step S153), and displays the ticket code on the display unit 25 of the communication terminal 20. Then, the ticket management unit 112 stores the ticket code generated in step S152, the expiration date input in step S151, and the terminal ID of the communication terminal 20 which is the transmission source of the request in the map ticket storage unit 133 in association with each other (Step S154).

Accordingly, the server device 10 can issue a ticket for adding the communication terminal 20 for displaying the position information to the My Map. When the ticket is issued, the user presents the ticket code of the ticket to another user who wishes to add the position information to the My Map. The presentation of the ticket code is made using a method such as oral notification or e-mail presentation.

Figure 8:
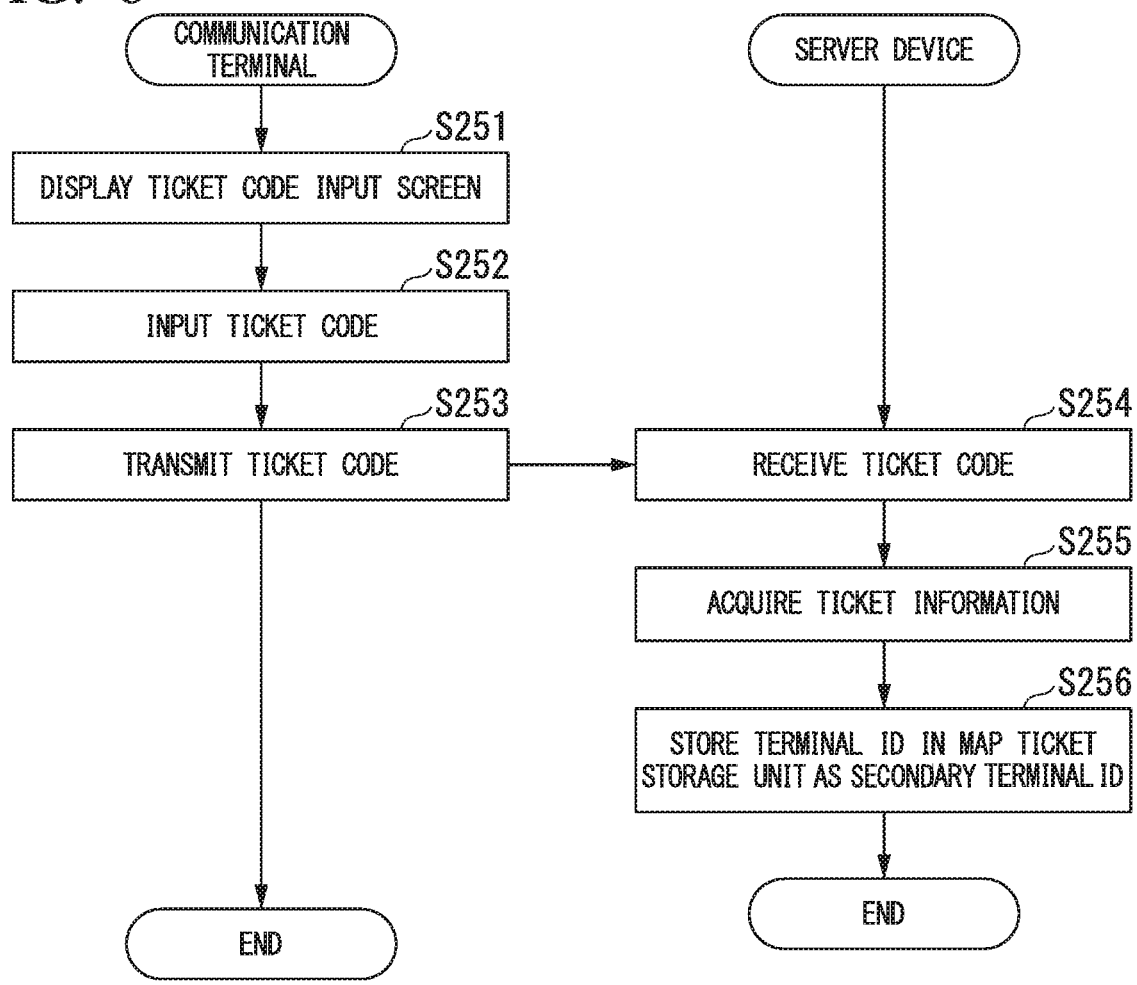
FIG. 8 is a sequence diagram illustrating a process at the time of input of a map ticket regarding a My Map in the construction management system according to the first embodiment.

FIG. 8 is a sequence diagram illustrating a process at the time of inputting a map ticket regarding My Map in the construction management system according to the first embodiment.

When the communication terminal 20 transitions to a map ticket input mode according to an operation of a user different from the user who wants to generate the My Map, the display control unit 211 causes the display unit 25 to display a map ticket input screen (Step S251). Then, the ticket code input unit 212 allows to receive an input of the ticket code via the input unit 24 (Step S252). When the ticket code is input, the ticket code input unit 212 transmits the input ticket code and the terminal ID to the server device 10 via the communication unit 26 (Step S253).

When the ticket code reception unit 113 of the server device 10 receives the ticket code from the communication terminal 20 (Step S254), the ticket code reception unit 113 of the server device 10 inquires of the ticket code stored in the map ticket storage unit 133 and the received ticket code (Step S255). Then, the ticket management unit 112 stores the terminal ID transmitted together with the ticket code in the map ticket storage unit 133 in association with the ticket code (Step S256). Accordingly, the construction management system 1 can associate the map ticket with the communication terminal 20.

Figure 9:
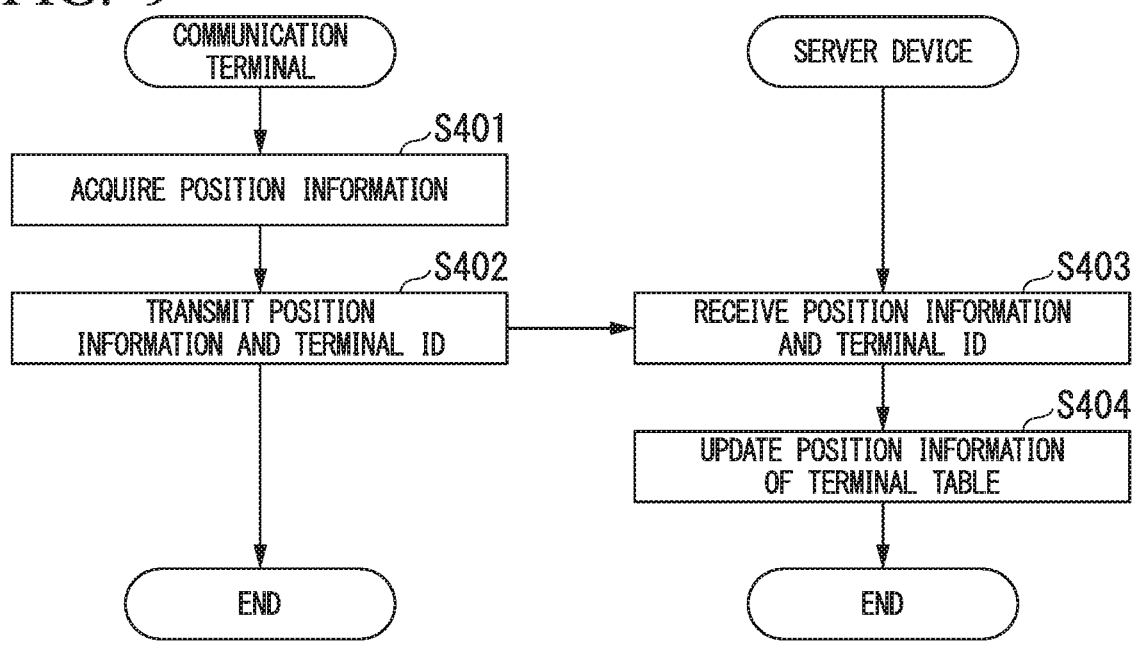
FIG. 9 is a sequence diagram illustrating a position information-updating process in the construction management system according to the first embodiment.

FIG. 9 is a sequence diagram illustrating a position information-updating process in the construction management system according to the first embodiment The communication terminal 20 executes a position notification process to periodically transmit the position information and the terminal ID to the server device 10. When the communication terminal 20 starts the position notification process, the position-specifying unit 216 specifies a current position of the communication terminal 20 on the basis of, for example, the GNSS signal received by the GNSS reception unit 27 (Step S401). Then, the position information transmission unit 217 transmits position information indicating the specified current position and the terminal ID to the server device 10 (Step S402).

When the information collection unit 111 of the server device 10 receives the position information and the terminal ID from the communication terminal 20 (Step S403), the information collection unit 111 of the server device 10 updates the position information associated with the received terminal ID stored in the terminal information storage unit 131 on the basis of the received position information (Step S404). Accordingly, the position information and the terminal information of the communication terminal 20 is periodically updated in the server device 10.

Figure 10:
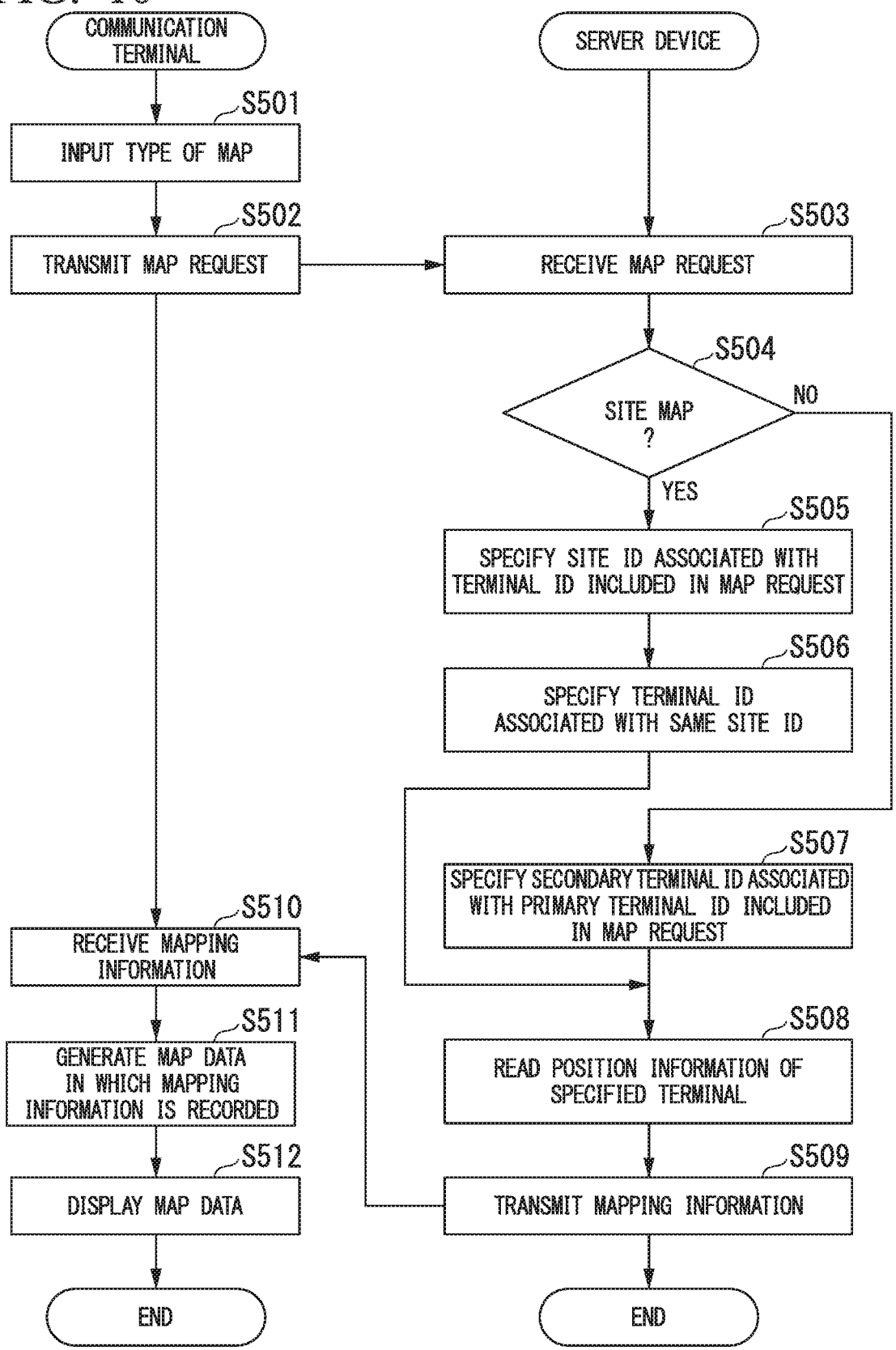
FIG. 10 is a sequence diagram illustrating a map image display process in the construction management system according to the first embodiment.

FIG. 10 is a sequence diagram illustrating a map image display process in the construction management system according to the first embodiment. When the communication terminal 20 is switched to the display mode of the map image according to an operation of the user, the map request input unit 218 allows to receive the input of the type of map (the site map or the My Map) to be displayed (Step S501). When the type of map is input, the map request transmission unit 219 transmits a map request including the input map type and the terminal ID to the server device 10 (Step S502).

When the map request reception unit 115 of the server device 10 receives the map request from the communication terminal 20 (Step S503), the map request reception unit 115 of the server device 10 determines whether or not the type included in the map request is the site map (Step S504). When the type of map is the site map (Step S504: YES), the map request reception unit specifies the site ID associated with the terminal ID included in the map request in the work ticket storage unit 134 (Step S505).

Then, the mapping information generation unit 116 specifies a terminal ID associated with the same site ID as the specified site ID and associated with an indication that the expiration date is a date after a current time from the work ticket storage unit 134 (Step S506).

On the other hand, when the type of map is the My Map (Step S504: NO), the mapping information generation unit 116 specifies a secondary terminal ID associated with the primary terminal ID that is the terminal ID of the communication terminal 20 transmitting the map request and that is included in the map request and an expiration date that is a date after a current time, in the map ticket storage unit 133 (Step S507).

When the terminal ID is specified in step S506 or S507, the mapping information generation unit 116 reads the position information associated with the specified terminal ID from the terminal information storage unit 131 (Step S508). The read position information is transmitted as mapping information together with the specified terminal ID to the communication terminal 20 (Step S509). In addition, when the map request is the site map, the mapping information generation unit 116 includes the position information of the loading place P1 and the unloading place P2 stored in the site information storage unit 132 in the mapping information.

When the mapping information reception unit 220 of the communication terminal 20 receives the mapping information from the server device 10 (Step S510), the display control unit 211 combines the position information indicated by the received mapping information with the background map image stored in the map storage unit 233 to generate a map image D (Step S511). The display control unit 211 displays the generated map image D on the display unit 25 (Step S512).

Thus, according to the first embodiment, the construction management system 1 can display the position information of the plurality of construction machines M1 and M2 operating at the same construction site by selecting the site map as the type of map. Further, according to the first embodiment, the construction management system 1 can display the position information of any construction machine M1 and transport vehicle M2 by selecting the My Map as the type of map. For example, it is possible to display the position information of the vehicle of the same business operator by associating vehicles related to the same business operator with the My Map.

Figure 11:
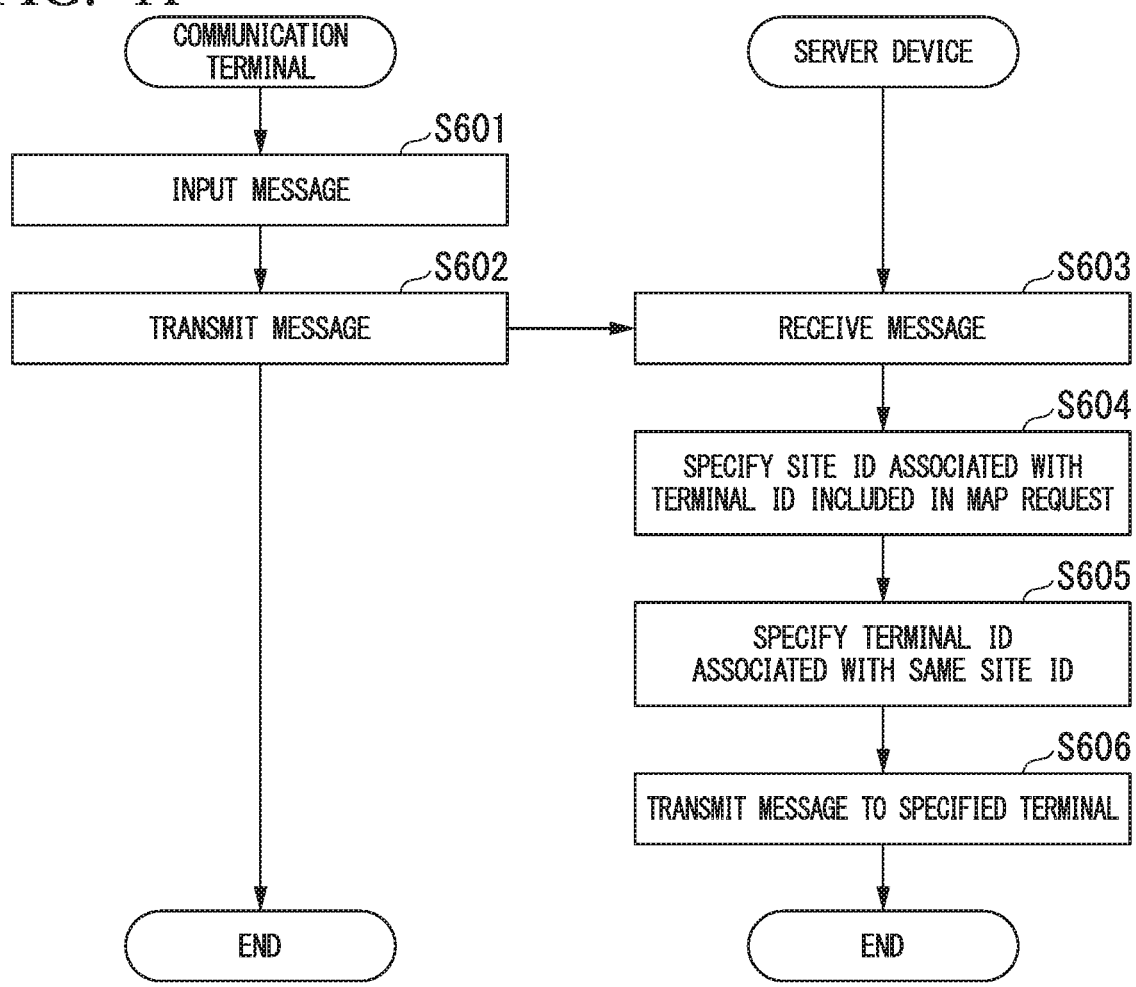
FIG. 11 is a sequence diagram illustrating a process of transmitting and receiving individual messages in the construction management system according to the first embodiment.

FIG. 11 is a sequence diagram illustrating an individual message transmission and reception process in the construction management system according to the first embodiment.

In the communication terminal 20, when switching to a message input mode is performed according to an operation of the user, the message transmission and reception unit 221 allows to receive an input of a message and terminal information such as the terminal ID of a message transmission destination (Step S601). When the message is input, the message transmission and reception unit 221 transmits the input message to the server device 10 in association with the terminal ID of the transmission source and the terminal ID of the transmission destination (Step S602).

When the message management unit 118 receives the message from the communication terminal 20 (Step S603), the message management unit 118 of the server device 10 specifies the received terminal ID of the transmission destination (Step S604). The message management unit 118 transmits the message received in step S603 to the communication terminal 20 indicated by the identified terminal ID (Step S605) as the message transmission to specified terminal step S606.

FIG. 13 is a sequence diagram illustrating a process of transmitting and receiving a broadcast message in the construction management system according to the first embodiment. In the communication terminal 20, when switching to the message input mode is performed according to an operation of the user, the message transmission and reception unit 221 allows to receive an input of the message (Step S701). When the message is input, the message transmission and reception unit 221 associates the input message with the terminal ID of the subject device and transmits a resultant message to the server device 10 (Step S702).

When the message management unit 118 of the server device 10 receives the message from the communication terminal 20 (a first communication terminal) (Step S703), the message management unit 118 of the server device 10 specifies a site ID associated with the terminal ID associated with the message in the work ticket storage unit 134 (Step S704). In the work ticket storage unit 134, the ticket related to the terminal ID associated with the message is an example of the first ticket acquired by the first communication terminal.

Then, the message management unit 118 specifies the terminal ID associated with the same site ID as the site ID specified from the work ticket storage unit 134 (Step S705). In the work ticket storage unit 134, the ticket associated with the same site ID as the specified site ID is an example of the second ticket. The message management unit 118 transmits the message received in step S703 to the communication terminal 20 (a second communication terminal) indicated by the specified terminal ID (Step S706). Accordingly, the worker can easily transmit the message to other workers working at the same construction site.

<<Operation and Effects>>

Thus, according to the first embodiment, the construction management system 1 issues a work ticket indicating the work related to the construction site and outputs the position information of each communication terminal 20 selecting the work ticket regarding the same construction site. Accordingly, it is possible to confirm position information of a plurality of work machines working at the same construction site regardless of whether or not the work machines are under management of the construction management system.

That is, when a work machine under the management of another person performs work at the same construction site, information on work machines operating at the same construction site can be aggregated by causing the other person to input the ticket code. In a management system in a relevant field, when position information on a work machine not under management of the management system is acquired, it is necessary to issue an account to another person, which is inconvenient. On the other hand, according to the first embodiment, it is possible to confirm position information of a plurality of work machines working at the same construction site through a simple operation. In particular, according to the first embodiment, the server device 10 outputs the position information of the communication terminal 20 included in the transport vehicle M2 to the communication terminal 20 included in the construction machine M1. Accordingly, an operator of the construction machine M1 can estimate a time when the transport vehicle M2 arrives at the loading place or the unloading place, and can prepare for loading or unloading in advance.

Further, according to the first embodiment, the server device 10 outputs the position information of each communication terminal 20 that has acquired the work ticket, and the position information of the loading place and the unloading place. Accordingly, the worker can recognize a positional relationship between the position of the work machine including the communication terminal 20, and the loading place and the unloading place. In addition, in another embodiment, the present invention is not limited thereto, and the server device 10 may output only the position information of the communication terminal 20 without outputting the position information of the loading place and the unloading place.

In addition, in the first embodiment, the position information of all the communication terminals 20 associated with the same construction site by the work ticket is transmitted to all the communication terminals 20 associated with the construction site, but the present invention is not limited thereto. For example, the server device 10 may output the position information of the communication terminal 20 only to the communication terminal 20 included in the construction machine M1. Further, for example, the server device 10 may output only the position information of the communication terminal 20 included in the transport vehicle M2.

Further, according to the first embodiment, the construction management system 1 issues the map ticket and outputs the position information of each communication terminal 20 that has selected the map ticket regarding the same group as the My Map. Accordingly, it is possible to display the position information of the construction machine M1 and the transport vehicle M2 according to an intention of the user.

For example, it is possible to display the position information of the vehicle of the same business operator by associating the vehicle related to the same business operator with My Map.

Further, according to the first embodiment, the server device 10 receives a message from the communication terminal 20, and transmits the message to another communication terminal 20 that has acquired the ticket associated with the same construction site as the ticket acquired by the communication terminal 20. Accordingly, the worker can easily make contact with other workers who work at the same construction site. In addition, in another embodiment, the present invention is not limited thereto. For example, the construction management system 1 according to another embodiment may not have a message function.

Other Embodiments

Although the embodiment has been described in detail with reference to the drawings, specific configurations are not limited to those described above, and various design changes and the like can be made.

For example, the construction management system 1 according to the first embodiment automatically generates the ticket code when issuing the ticket, but the present invention is not limited thereto. For example, the construction management system 1 according to another embodiment may receive an input of the ticket code from the user.

Further, the communication terminal 20 according to the first embodiment can store information on a plurality of tickets in the work ticket storage unit 232, but the present invention is not limited thereto. For example, the communication terminal 20 according to another embodiment may receive only an input of a ticket code of one ticket related to actually engaged work. In this case, information on zero or one ticket is recorded in the work ticket storage unit 232.

Further, the construction management system 1 according to the first embodiment has both a site map function and a My Map function, but the present invention is not limited thereto. For example, the construction management system 1 according to another embodiment may have only any one of the site map function and the My Map function.

Further, the construction management system 1 according to the first embodiment transmits the position information of each communication terminal 20 associated with the construction site to the communication terminal 20, which is the map request transmission source in the server device 10, and the communication terminal 20 that is the map request transmission source generates the map image, but the present invention is not limited thereto. For example, in the construction management system 1 according to another embodiment, the server device 10 generates the map image and transmits the generated map image to the communication terminal 20, which is the map request transmission source.

In addition, although the construction management system 1 according to the first embodiment generates the My Map for each primary terminal, the present invention is not limited thereto. For example, in the construction management system 1 according to another embodiment, a group consisting of any communication terminals 20 may be generated, and when the communication terminal 20 owned by a member in the group sends a map request of the My Map to the server device 10, a map image (My Map) based on position information of the respective communication terminals 20 owned by the members in the group may be created and displayed on the communication terminal 20, which is a map request transmission source.

Further, in the construction management system 1 according to the first embodiment, the server device 10 functions as the management device, but the present invention is not limited thereto. For example, in the construction management system 1 according to another embodiment, the communication terminal 20 may function as the management device. That is, the communication terminal 20-1 included in the construction machine M1, the communication terminal 20-2 included in the transport vehicle M2, and the communication terminal 20-3 or the communication terminal 20-4 used by the manager M3 include a ticket issuance unit, a position information acquisition unit, and an output unit. In this case, the communication terminal 20 may include the ticket management unit 112, the map request reception unit 115, the mapping information generation unit 116, and the mapping information transmission unit 117. The position-specifying unit 216 is an example of the position information acquisition unit, the ticket management unit 112 is an example of the ticket issuance unit, and the mapping information transmission unit 117 is an example of the output unit.

INDUSTRIAL APPLICABILITY

According to at least one of the above aspects, a management device capable of confirming position information of a plurality of work machines working at the same construction site regardless of whether or not work machines are under management of a management device, a construction management system, and a position information management method are provided.

REFERENCE SIGNS LIST

1 Construction management system
10 Server device
20 Communication terminal
131 Terminal information storage unit
132 Site information storage unit
133 Map ticket storage unit
134 Work ticket storage unit
111 Information collection unit
112 Ticket management unit
113 Ticket code reception unit
114 Registration notification transmission unit
115 Map request reception unit
116 Mapping information generation unit
117 Mapping information transmission unit
118 Message management unit
231 Terminal information storage unit
232 Work ticket storage unit
233 Map storage unit
211 Display control unit
212 Ticket code input unit
213 Ticket selection unit
215 Registration notification reception unit
216 Position-specifying unit
217 Position information transmission unit
218 Map request input unit
219 Map request transmission unit
220 Mapping information reception unit
221 Message transmission and reception unit

The invention claimed is:

1. A construction management method comprising the steps of:

creating a group by a server device;
issuing a work ticket associated with the group;
issuing a ticket code for adding a communication terminal to the group, the ticket code being included as information of the work ticket;
accessing the server device from a first communication terminal owned by a first operator of a transport vehicle or a construction machine;
adding the first communication terminal to the group by entering the ticket code by the first communication terminal;
transmitting, by the first communication terminal, a position information of the first communication terminal to the server device; and
transmitting, by the server device, the position information of the first communication terminal to a second communication terminal based on a request from the second communication terminal, the second communication terminal owned by a second operator and has already been added to the group.

2. The construction management method according to claim 1,
wherein the work ticket includes information of the ticket code and an expiration date which is the expiration date of a work indicated by the work ticket.

3. The construction management method according to claim 1, further comprising:
the transport vehicle or construction machine being located at a construction site which includes a loading place and an unloading place, and
outputting position information of each communication terminal acquiring the work ticket, and position information of the loading place and the unloading place.

4. The construction management method according to claim 1, further comprising:
issuing the work ticket for every type of work, and
the type of work includes the use of at least the transport vehicle and the construction machine.

5. The construction management method according to claim 1, further comprising:
receiving a message from the first communication terminal acquiring a first ticket that is the work ticket, and
transmitting the message to the second communication terminal acquiring a second ticket that is the work ticket associated with a same construction site as the first ticket.

6. The construction management method according to claim 1, further comprising:
storing a map image of a position each communication terminal, in a different aspect for each type of work.

7. A management device, comprising:
a server device for creating a group;
a work ticket issuing unit for issuing a work ticket associated with the group and for issuing a ticket code for adding a communication terminal to the group, the ticket code being included as information of the work ticket;
a first communication terminal owned by a first operator of a transport vehicle or a construction machine for accessing the service device, the first communication terminal being added to the group by entering the ticket code by the first communication terminal and the first communication terminal configured for transmitting a position information of the first communication terminal to the server device; and
a second communication terminal, configured to receive a transmission by the service device of the position information of the first communication device, based on a request from the second communication terminal, the second communication terminal owned by a second operator and has already been added to the group.

8. The management device according to claim 7,
wherein the work ticket includes information of the ticket code and an expiration date which is the expiration date of a work indicated by the work ticket.

9. The management device according to claim 7, further comprising:
a map generation unit that generates a map image on the basis of the position information output by the management device.

10. The management device according to claim 7, further comprising:
the transport vehicle or construction machine being located at a construction site which includes a loading place and an unloading place, and
an output unit outputting a position information of each communication terminal acquiring the ticket, and a position information of the loading place and the unloading place.

11. The management device according to claim 7,
wherein the work ticket issuing unit issues the work ticket for every type of work, and
the type of work includes the use of at least the transport vehicle and the construction machine.

12. The management device according to claim 7, further comprising:
a message management unit that is configured to receive a message from the first communication terminal acquiring a first ticket that is the ticket, and to transmit the message to a second communication terminal acquiring a second ticket that is the ticket associated with a same construction site as the first ticket.

13. The management device according to claim 9,
wherein in the map image, a position of each communication terminal is stored in a different aspect for each type of work.

14. A construction management system, comprising:
one or more transport vehicles associated with a construction site;
one or more construction machines associated with the construction site;
a server device for creating a group;
a work ticket issuing unit for issuing a work ticket associated with the group and for issuing a ticket code for adding a communication terminal to the group, the ticket code being included as information of the work ticket;
a first communication terminal, included in each of the one or more transport vehicles having a respective terminal ID, owned by a first operator of a transport vehicle or a construction machine for accessing the service device, the first communication terminal being added to the group by entering the ticket code by the first communication terminal and the first communication terminal configured for transmitting a position information of the first communication terminal to the server device;
a second communication terminal, included in each of the one or more construction machines having a respective terminal ID, configured to receive a transmission by the service device of the position information of the first communication device, based on a request from the second communication terminal, the second communication terminal owned by a second operator and has already been added to the group;

a position information acquisition unit in the server, configured to acquire position information of each of the first communication terminals and each of the second communication terminals on the basis of the one or more tickets; and a display unit in each of the registered one or more transport vehicles and the registered one or more construction machines, configured to display a map image in which the positions of each of the first communication terminals and each of the second communication terminals working in the same construction site are stored on the basis of the position information acquired by the position information acquisition unit.

15. The construction management system according to claim 14, wherein the work ticket includes information of the ticket code and an expiration date which is the expiration date of a work indicated by the work ticket.

16. The construction management system according to claim 14, further comprising:

a map generation unit that generates a map image on the basis of the position information output by the management device.

17. The construction management system according to claim 14, further comprising:

the construction site which includes a loading place and an unloading place, and an output unit outputting a position information of each communication terminal acquiring the ticket, and a position information of the loading place and the unloading place.

18. The construction management system according to claim 14, wherein the work ticket issuing unit issues the work ticket for every type of work, and the type of work includes the use of at least the transport vehicle and the construction machine.

19. The construction management system according to claim 14, further comprising:

a message management unit that is configured to receive a message from the first communication terminal acquiring a first ticket that is the ticket, and to transmit the message to a second communication terminal acquiring a second ticket that is the ticket associated with a same construction site as the first ticket.

20. The construction management system according to claim 16, wherein in the map image, a position of each communication terminal is stored in a different aspect for each type of work.

* * * * *